United States Patent [19]

Kanazawa

[11] Patent Number: 5,885,011
[45] Date of Patent: *Mar. 23, 1999

[54] ELECTRONIC APPARATUS WITH PRINTER

[75] Inventor: Manabu Kanazawa, Yokohama, Japan

[73] Assignee: Canon Electronic Business Machines (H.K.) Co., Ltd., Kowloon, Hong Kong

[ * ] Notice: This patent issued on a continued prosecution application filed under 37 CFR 1.53(d), and is subject to the twenty year patent term provisions of 35 U.S.C. 154(a)(2).

[21] Appl. No.: 524,410

[22] Filed: Sep. 6, 1995

[30] Foreign Application Priority Data

Sep. 9, 1994 [JP] Japan ..................... 6-215896

[51] Int. Cl.⁶ ............................................. B41J 5/30
[52] U.S. Cl. ......................... 400/61; 400/279; 400/582
[58] Field of Search ................... 400/61, 62, 76, 400/77, 78, 279, 322, 328, 582; 235/58 R, 58 TP, 58 P, 59 R; 395/101, 105

[56] References Cited

U.S. PATENT DOCUMENTS

| 4,527,917 | 7/1985 | Ueno | 400/78 |
| 4,553,219 | 11/1985 | Ueno | 400/78 |
| 4,833,626 | 5/1989 | Malcolm | 395/105 |
| 5,276,466 | 1/1994 | Tsukada et al. | 346/139 R |
| 5,454,065 | 9/1995 | Toyomura | 400/62 |

FOREIGN PATENT DOCUMENTS

| 55-164178 | 12/1980 | Japan | 400/78 |
| 57-004775 | 1/1982 | Japan | 400/322 |
| 3-026559 | 2/1991 | Japan | 395/101 |
| 5-181805 | 7/1993 | Japan . | |
| 5-342165 | 12/1993 | Japan . | |
| 6-332863 | 12/1994 | Japan . | |

*Primary Examiner*—John S. Hilten
*Attorney, Agent, or Firm*—Fitzpatrick, Cella, Harper & Scinto

[57] ABSTRACT

In an electronic apparatus with a printer, there is disclosed a technique such that a printing is performed at a printing speed according to a key operation of the user and, when the user wants to rapidly see the printing result such as an arithmetic operation result or the like irrespective of the key operation, it can be printed at a high speed.

28 Claims, 5 Drawing Sheets

ELECTRONIC APPARATUS WITH PRINTER

BACKGROUND OF THE INVENTION

1. Field of the Invention

The invention relates to an electronic apparatus with a printer such as an electronic portable calculator.

2. Related Background Art

As an example of conventional electronic apparatuses with printers, an electronic portable calculator (hereinafter, simply referred to as a "calculator") will now be described hereinbelow. The calculator has a printer of a predetermined printing speed according to the type of apparatus. The printer prints in accordance with a key operation, particularly, an operation of a function key such as addition "+", subtraction "−", multiplication "×", division "÷", sign of equality "=", or the like. For example, a full-scale office calculator that is used in a bank, company, office, or the like is equipped with a relatively high speed printer having a printing speed of 3.8 l/sec or 5 l/sec. On the other hand, a portable calculator is equipped with a relatively low speed printer having a printing speed of 2 l/sec or 3 l/sec. Therefore, the user who desires a high speed printing process as in bank business affairs generally purchases a calculator with a high speed printer having a printing speed such as 5 l/sec. The general user who does not need a high speed printing process ordinarily purchases a calculator with a low speed printer having a printing speed such as 2 l/sec.

Conventional apparatuses equipped with printers have the following problems because the printer have different printing speeds.

Generally, there is a proportional relation between the printing speed of the printer and the noises generated upon printing. As the printing speed rises, the noises generated upon printing increase.

There is likewise a proportional relation between the printing speed and the electric power consumption. As the printing speed rises, the electric power consumption increases.

Therefore, when different printing speeds are installed on a calculator, and the printing speed is fixed to a predetermined speed as mentioned above, even when a user slowly operates a key, the printer always prints at a high speed. Such is the case for full-scale office calculators used in a bank, company, office, or the like. There are consequently problems such that the noises which are generated upon printing are large and the electric power consumption also increases. On the other hand, in case of the portable calculator, when the user becomes experienced in the key operation and the key operating speed rises, there is a problem such that the low speed printer cannot keep up with the key operation of the user.

To solve such problems, apparatuses such that the printing speed (printing mode) is changed in accordance with the key operating speed of the user have already been proposed. For instance, there are an apparatus such that the printing speed is changed in accordance with an input speed of a key (Japanese Patent Application Laid-open No. 5-181805), an apparatus such that the printing speed is changed in accordance with an amount of key buffer (Japanese Patent Application Laid-open No. 5-342165), and an apparatus such that the printing speed is changed in accordance with an amount of key buffer during the printing process (Japanese Patent Application No. 5-139992, which corresponds to Japanese Patent Application Laid-Open No. 6-332863). According to those apparatuses, the printing speed is raised when it is necessary to print at a high speed.

However, in the above conventional electronic apparatuses with printers, fundamentally, the printing speed is set to a high speed for a high speed key operation and to a low speed for a low speed key operation. Therefore, there is a problem such that in case of a slow key operation, although a fast key operation cannot be performed, the user wants to quickly see the print result (for example, in case of the printing of the result of a calculation), the printing speed is not necessarily high enough.

SUMMARY OF THE INVENTION

The present invention is made in consideration of the problems in the conventional electronic apparatuses with printers as mentioned above. It is an object of the invention to provide an electronic apparatus with a printer, in which the printing is performed at a printing speed according to a key operation of the user and, when the user wants to quickly see the result of printing such as a result of an arithmetic operation irrespective of the key operation, the printing can be performed at a high speed.

Another object of the invention is to provide an electronic apparatus with a printer, in which even for another input that is executed during the printing of the result of a calculation, a process is simultaneously performed in the same printing mode as that of the arithmetic operation result, so that there is not a sudden change in printing speed.

To accomplish the above object, there is provided an electronic apparatus with a printer having key input means including keys which were set so as to print, an arithmetic operation unit to calculate data inputted through the key input means, and a printer to print the result calculated by the arithmetic operation unit, wherein the electronic apparatus comprises: control means for controlling the printer at a plurality of printing speeds; discriminating means for discriminating a key input to print the arithmetic operation result; and selecting means for selecting a specific printing speed when the key input to print the arithmetic operation result is executed as a result of the discriminating means.

According to the invention, when the key input to print the arithmetic operation result is executed, the arithmetic operation result is printed in a printing mode at the highest speed of the printer.

According to the invention, the electronic apparatus has means for continuing the printing mode of the arithmetic operation result in response to another key input to print performed during the printing of the arithmetic operation result.

According to the invention, there is provided an electronic apparatus with a printer for controlling a plurality of printing modes, wherein the apparatus has means for judging a printing of the arithmetic operation result and a special printing speed, particularly, the highest printing speed is set for such a printing of the arithmetic operation result, so that even when the apparatus is set to any printing mode, the arithmetic operation result can be printed at a high speed. In the apparatus for controlling the printing speed by a key operation, in case of the user of a slow key operation, a high printing speed is hardly set, so that an advantage of the invention is large.

By providing means for continuing the printing mode during the printing of the arithmetic operation result for a new print input during the printing of the arithmetic operation result, an extreme change in printing speed such that the arithmetic operation result is printed at the highest speed and the subsequent printing is performed at the lowest speed does not occur. Therefore, the user can use the apparatus without a feeling of physical disorder and a mechanical and electrical burden on the printer is small.

DETAILED DESCRIPTION OF THE PREFERRED EMBODIMENTS

Figure 1:
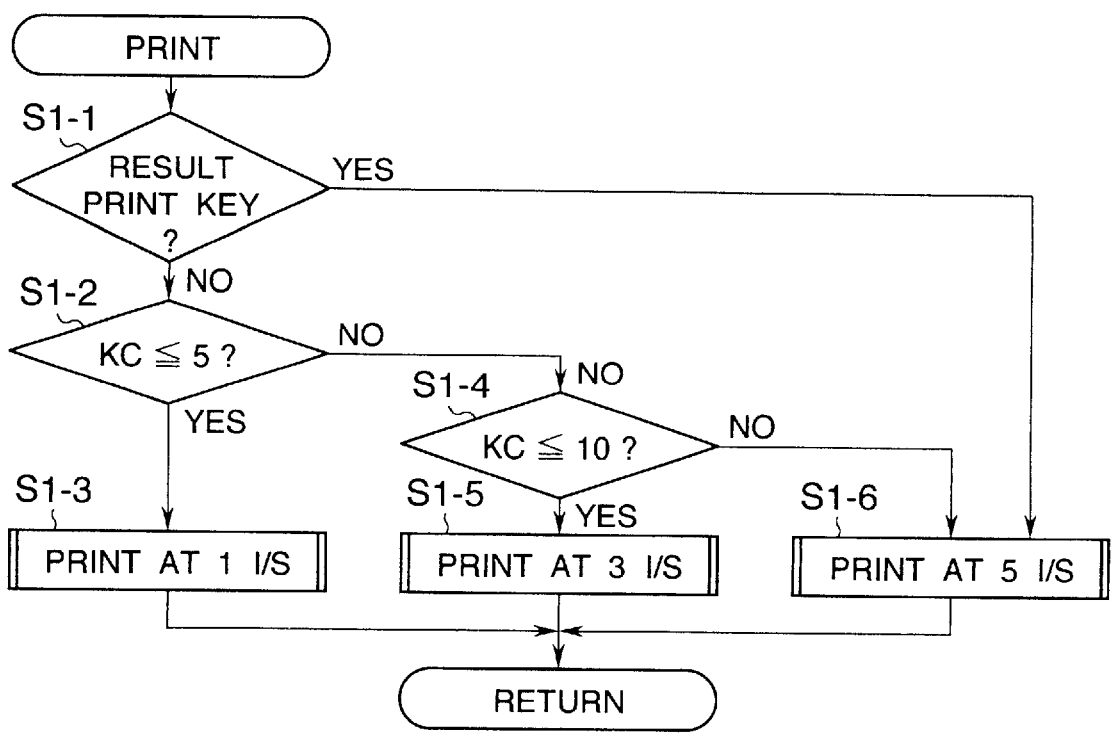
FIG. 1 is a flowchart showing a printing speed control procedure of a calculator according to the first embodiment of the invention.

An embodiment of the invention will now be described hereinbelow with reference to the drawings.

First, the first embodiment of the invention will be described with reference to FIGS. 1 to 4. FIG. 2 is a block diagram showing a schematic construction of a control circuit of an electronic apparatus with a printer according to the first embodiment of the invention. FIG. 2 is a diagram in the case where the invention is applied to a calculator (portable electronic calculator).

As shown in FIG. 2, the calculator of the embodiment includes a keyboard 1, a microprocessor unit (hereinafter, simply referred to as an MPU) 2 serving as arithmetic operating means; a display 3 to display an arithmetic operation result or the like; and a printer 4 which can print the arithmetic operation result or the like at a variable printing speed. The whole calculator of the embodiment is controlled by the MPU 2.

The keyboard 1 has numerical keys to input numerical value data by the user; four-rules calculation keys including addition "+", subtraction "−", multiplication "×" division "÷", and a sign of equality "="; and function keys such as clear key "C", memory key "M+", and the like.

The function keys include keys to print the results of arithmetic operations when they are depressed. The arithmetic operation result keys include: "*" (total key); "=" (equal key); "*=" (total equal key); "%±−" "%−" (percentage calculation, extra/discount calculation); "Δ%" (increase/decrease ratio calculation key); "MU/MD" (mark-up/mark-down key); and "T" "M*" (total memory key).

The function keys also include keys to print the results during the calculations. As representative keys of such function keys, there are "◇" (subtotal key), "S" "M◇" (subtotal memory key), and the like.

In the following explanation, it is assumed that the "calculation result print keys" include the function keys to print the results of calculations and the function keys to print the results during the calculations as mentioned above.

Although there is a case where the symbols or the names of keys differ depending on the manufactures or apparatuses or there are also a number of print keys having other functions, it will be obviously understood that any other key is included in the "arithmetic result printing keys" so long as it is a key to print a certain arithmetic operation result.

The MPU 2 includes an arithmetic logic unit (hereinafter, referred to as an ALU) 21 for mainly executing an arithmetic operation corresponding to the key input from the keyboard 1; a read only memory (hereinafter, referred to as an ROM) 22 in which control programs which are executed by the ALU 21 have previously been stored; a memory unit (hereinafter, referred to as an MEM unit) 23 that is constructed by a random access memory (hereinafter, referred to as an RAM) and is used to store input data, arithmetic operation results, and the like; a timer 24 for generating a timing pulse at, for example, every 5 msec, thereby allowing the ALU 21 to execute an interrupting process; and an input controller 25 for outputting a key signal to the keyboard 1 and for detecting a key operation signal.

The ALU 21 has an adding circuit and an 8-bit accumulator Acc and controls the input controller 25, timer 24, and MEM unit 23 on the basis of the control programs previously stored in the ROM 22 and executes an arithmetic operation according to operations of the numerical key, function key, and the like of the keyboard 1.

The MEM unit 23 has a key buffer register (KB) 23a serving as key input buffer means for sequentially storing key code information corresponding to the keys inputted from the keyboard 1 in accordance with the key operations; an AR register (AR) 23b for storing the input numerical value data or arithmetic operation data; a key buffer counter (KC) 23c for storing count information (KC) or the like necessary for control; and an Fl memory (FL) 23d for storing a flag (Fl) necessary for control.

The MPU 2 has an output controller 26 serving as control means for outputting the arithmetic operation result by the ALU 21 to the display 3 and printer 4 under the control of the ALU 21.

As a printer, various types of printers are known. For example, there are well known the printer of a parallel printing type which has printing ribbons for two colors and executes the printing by driving printing hammers all together, a printer of a thermal printing type in which a thermal head constructed by vertically arranging heat generating elements each for a few dots in a line is moved to the right and left by a motor driving and the printing is performed onto a thermal paper, a printer of a serial thermal jet type in which a thermal jet head for ejecting an ink by a bubble by heating the heat generating elements is moved to the right and left by a motor and the printing is performed, and the like.

In the embodiment, as shown in FIG. 2, the printer 4 of the thermal printing type such that a thermal head in which heat generating elements 41 each for a few dots are vertically arranged in a line is moved to the right and left by a stepping motor 42 and the printing is performed to a thermal paper is used.

In the printer 4, a driver 43 is connected to the output controller 26 through a thermal register 27. A driver 44 is connected to the output controller 26 through a motor register 28.

A current is selectively supplied to the heat generating elements 41 of the printer and a heat generation occurs in accordance with print data by the driver 43. The stepping motor 42 is rotated by the driver 44 and moves the thermal head to the right or left. A printing speed of the printer 4 is determined by a driving speed of the stepping motor 42 and is controlled by generating a driving signal to the motor register 28 for driving the motor from the output controller 26 on the basis of a control command.

The heat generating elements 41 selectively generate heat by outputting a current supplying signal that is necessary to print from the output controller 26 to the thermal register 27 on the basis of a control command of the MPU 2.

The operation of the embodiment, particularly, the operation of the ALU 21 will now be described with reference to FIGS. 1, 3, and 4.

Figure 3:
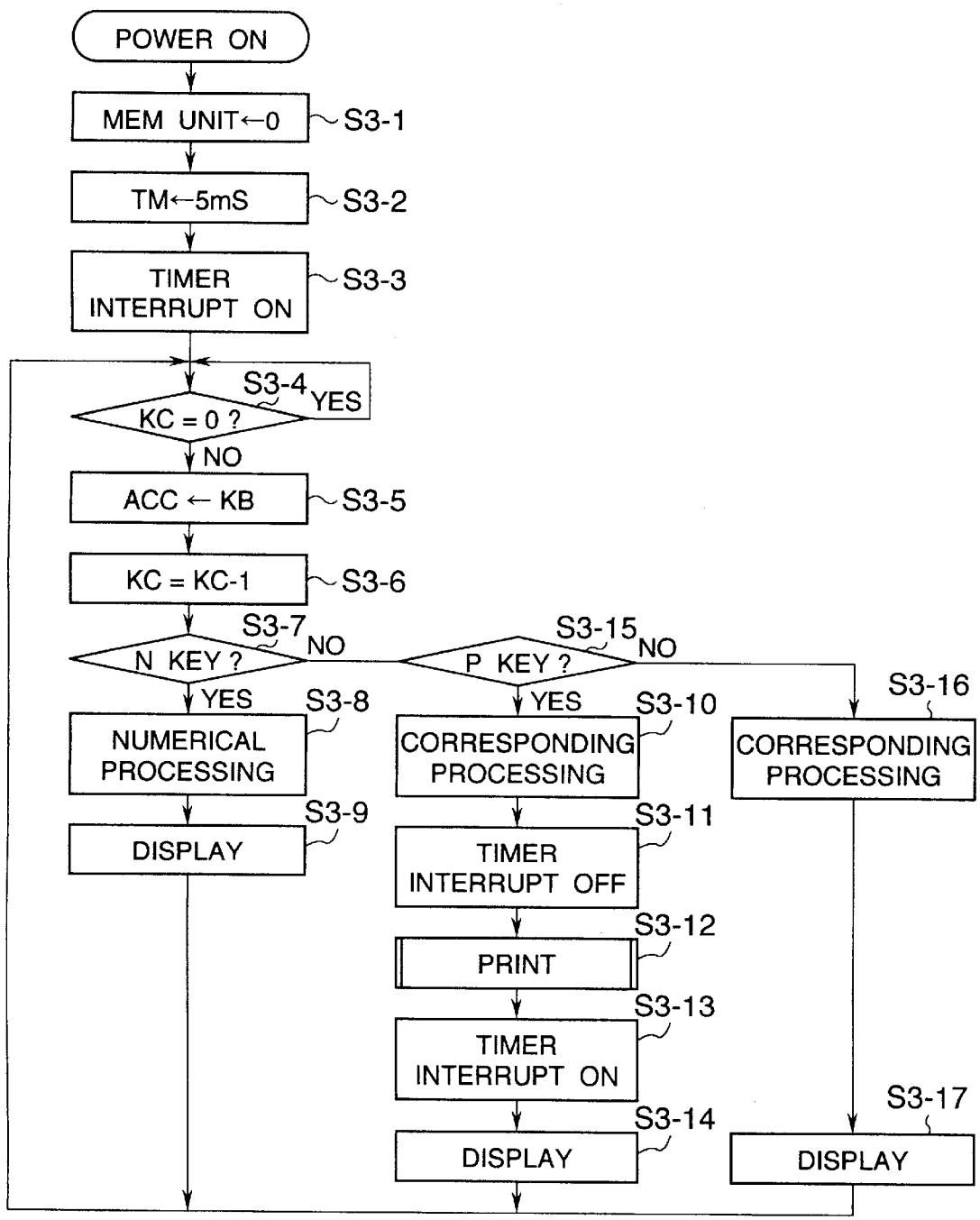
FIG. 3 is a main flowchart showing a control procedure of the calculator according to the embodiment of the invention.

FIG. 3 is a main flowchart showing a printing speed control procedure of the calculator according to the embodiment. First, in step S3-1, when a power source (not shown) is turned on, the memory contents of the MEM unit 23 are cleared to "0". In step S3-2, a timer value (TM) of the timer 24 is set to 5 msec. After that, in step S3-3, a timer interrupting operation is turned on. Thus, an interrupting process shown in FIG. 4 is executed every timer value 5 msec set in step S3-2. When a key is depressed, a process to store key code information corresponding to the depressed key into the key buffer register (KB) 23a is executed. The interrupting process shown in FIG. 4 will be described in detail hereinbelow.

In step S3-4, discrimination regarding whether the key code information has been stored in the key buffer register (KB) 23a [namely, a count value of the key buffer counter (KC) =0 ?] is executed until such key code information is stored. Such a procedure corresponds to a state in which the above process is repeated for a period of time during which no key is operated and the apparatus waits for a key operation. In step S3-4, when the key is operated and the corresponding key code information is stored into the key buffer register (KB) 23a (the details are shown in FIG. 4), the count value of the key buffer counter (KC) is not equal to 0, so that step S3-5 follows. In step S3-5, the key code information stored in the key buffer register (KB) 23a is called out to the accumulator Acc of the ALU 21.

Subsequently, in step S3-6, "1" is subtracted from the count value of the key buffer counter (KC) 23c. When the key code information is stored into the key buffer register (KB) 23a, "1" is added to the count value of the key buffer counter (KC) 23c (refer to step S4-3 in FIG. 4), so that when the key code information is called out from the key buffer register (KB) 23a, "1" has been subtracted from the count value of the key buffer counter (KC) 23c. Therefore, by checking the count value of the key buffer counter (KC) 23c, the number of key code information stored in the key buffer register (KB) 23a can be known.

In step S3-7, a check is made to see if the key code information called out to the accumulator Acc denotes the numeral (N) key or another arithmetic operation key. When the key code information in the accumulator Acc denotes the numerical key, step S3-8 follows and the numerical processing corresponding to the operated numerical key is executed.

In subsequent step S3-9, a displaying process is executed and the result of the numerical processing is displayed on the display 3. After that, the processing routine is returned to step S3-4 and the apparatus waits for the operation of another key.

On the other hand, in step S3-7, when an arithmetic operation key other than the numerical key is operated and the corresponding key code information is stored in the key buffer register (KB) 23a, a check is made to see if the key code information indicates a print key (P key) to print or not in step S3-15. If YES, step S3-10 follows and the arithmetic operating process corresponding to the key code information, for example, an adding process in case of the "+" key, a subtracting process in case of the "−" key, or the like is executed.

In step S3-11, the timer interrupting operation is turned off and a fetching of the key by the timer interruption is inhibited. Since the printing process in step S3-12 as a next print processing routine has a higher priority, the execution of the fetching of the key in the printing process routine is inhibited. The print processing routine will be described in detail hereinafter with reference to FIG. 1.

After completion of the printing process, the timer interrupting operation is turned on in step S3-13, thereby again cancelling the fetching of the key by the interruption at every 5 msec. In step S3-14, a process to display the contents of the arithmetic operation result to the display 3 is executed. After that, the processing routine is returned to step S3-4 and the apparatus waits for another key operation. When NO in step S3-15, an arithmetic operating process is executed in step S3-16 and a displaying process is performed in step S3-17. After that, the processing routine is returned to step S3-4 and the apparatus waits for another key operation. In this manner, the process corresponding to the key operated is executed.

Figure 4:
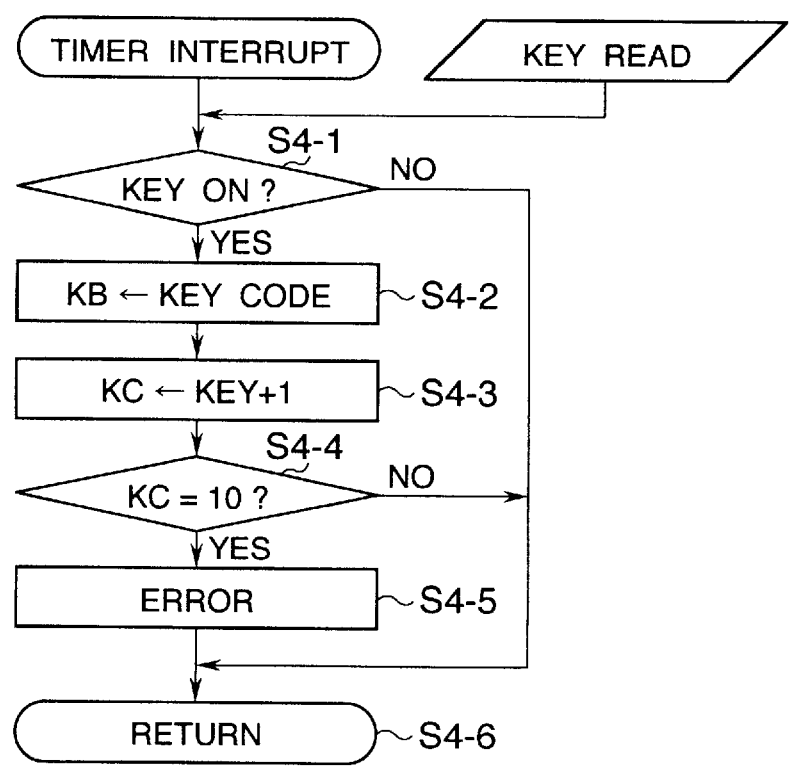
FIG. 4 is a flowchart showing a subroutine program for a key interruption of the calculator according to the embodiment of the invention.

FIG. 4 shows a key interrupting program as a subroutine program. In the diagram, even when there is a timer (TM) interruption or even when a key reading is called, a process is executed from step S4-1. A key code is read from the keyboard in the subroutine.

First in step S4-1, a check is made to see if the key has been operated or not and a check is also made to see if the operated key is the first key that is not yet fetched or not. When the key is not operated or when the key has already been fetched, a return command is executed in step S4-6 and the subroutine process is finished.

In step S4-1, when the first key that is not yet fetched has been operated, the processing routine advances to step S4-2 and the key code of the operated key is stored into the key buffer register (KB) 23a.

In next step S4-3, "1" is added to the count value of the key buffer counter (KC) 23c. Each time one key code is stored into the key buffer register (KB) 23a, a process to add "1" to the count value is executed. Each time one key code is read out from the main program, a process to subtract "1" from the count value is executed. Thus, the count value is equal to the number of key codes stored in the key buffer register (KB) 23a. By checking the count value, the number of key codes stored in the key buffer register (KB) 23a can be known.

In next step S4-4, a check is made to see if the count value of the key buffer counter (KC) 23c is equal to "10" or not. When it is equal to 10 as an upper limit of the capacity of the key buffer, the processing routine advances to step S4-5 and an error process is executed. After that, a return command in step S4-6 is executed and the processing operation is finished. When the count value of the key buffer counter (KC) 23c is less than 10 in step S4-4, the return command is executed in step S4-6 and the processing operation is finished.

As mentioned above, the key reading process is executed by the interrupting operation at every 5 msec and the key is fetched and the key code is stored into the key buffer register (KB) 23a. As described in the main program of FIG. 3 mentioned above, the above processes are executed in all of the operations other than the interval during the printing process.

Figure 2:
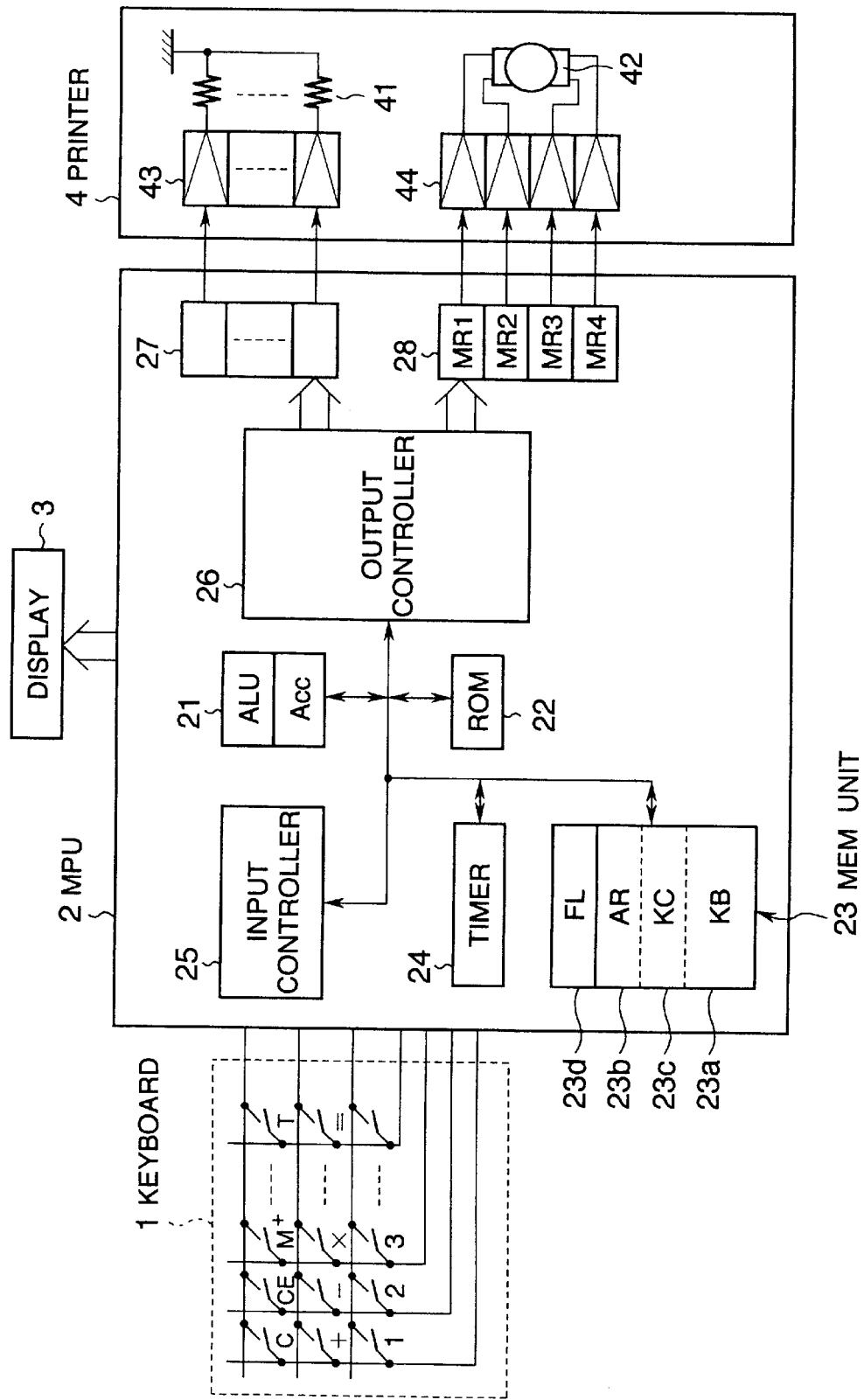
FIG. 2 is a block diagram showing a schematic construction of a control circuit of the calculator according to the embodiment of the invention.

FIG. 1 shows a print processing subroutine. When the print processing program is called in step S3-12 in FIG. 3, a check is made to see if it relates to the arithmetic operation result print key or not from the key code information of the key buffer register (KB) 23a.

If NO, a check is made in next step S1-2 to see if the number of key codes stored in the key buffer memory (KB)

23a is equal to the value of five keys, namely, whether the count value of the key buffer counter (KC) 23c is equal to 5 or less or not. When the count value of the key buffer counter (KC) 23c is equal to or less than 5, step S1-3 follows. The stepping motor 42 is driven at a frequency of 0.2 kHz and the printing process is executed at a printing speed of 1 l/sec. The processes of this subroutine are finished.

In step S1-2, when the count value of the key buffer counter (KC) 23c is larger than 5, a check is further made in step S1-4 to see if the count value of the key buffer counter (KC) 23c is equal to 10 or less or not. When it is equal to or less than 10, step Si-5 follows and the stepping motor 42 is driven at a frequency of 0.6 kHz and the printing process is executed at a printing speed of 3 l/sec.

When the count value of the key buffer counter (KC) 23c is larger than 10 in step S1-4, the stepping motor 42 is driven at a frequency of 1 kHz in step S1-6 and the printing process is executed at the highest printing speed of 5 l/sec. The printing process is finished.

When the key code information indicates the arithmetic operation result print key in step S1-1, the processing routine advances to step S1-6. The printing process is executed at the highest printing speed of 5 l/sec irrespective of the count value of the key buffer counter (KC) 23c.

As described above, in the electronic apparatus with the printer in which the printing mode is controlled in accordance with an amount of key buffer (count value of the key buffer counter), the judgment about the arithmetic operation result print key is performed before checking the count value of the key buffer counter. Thus, even for any user, the print result which he wants to quickly know can be printed at the highest printing speed or in a predetermined printing mode irrespective of the key operation. Particularly, for the user of a slow key operation, since the printing speed hardly becomes a high speed, an effect of the invention is large. Moreover, the printer which changes the printing speed in accordance with the key operation of the user effectively uses advantages such as reduction in printing noises, saving of the electric power consumption, and improvement of the operability as an electronic apparatus.

[Second embodiment]

In the first embodiment, in the case where the arithmetic operation result is printed in a specific printing mode, particularly, at the highest printing speed, in many cases, the print key input during the printing is small, for the input during the arithmetic operation result printing, the printing speed often becomes the lowest printing speed after the arithmetic operation result was printed. Namely, after the arithmetic operation result was printed at the highest printing speed, the printing often suddenly changes to the printing at the lowest printing speed. Therefore, not only a use feeling is bad but also a large burden is exerted on the printer.

Figure 5:
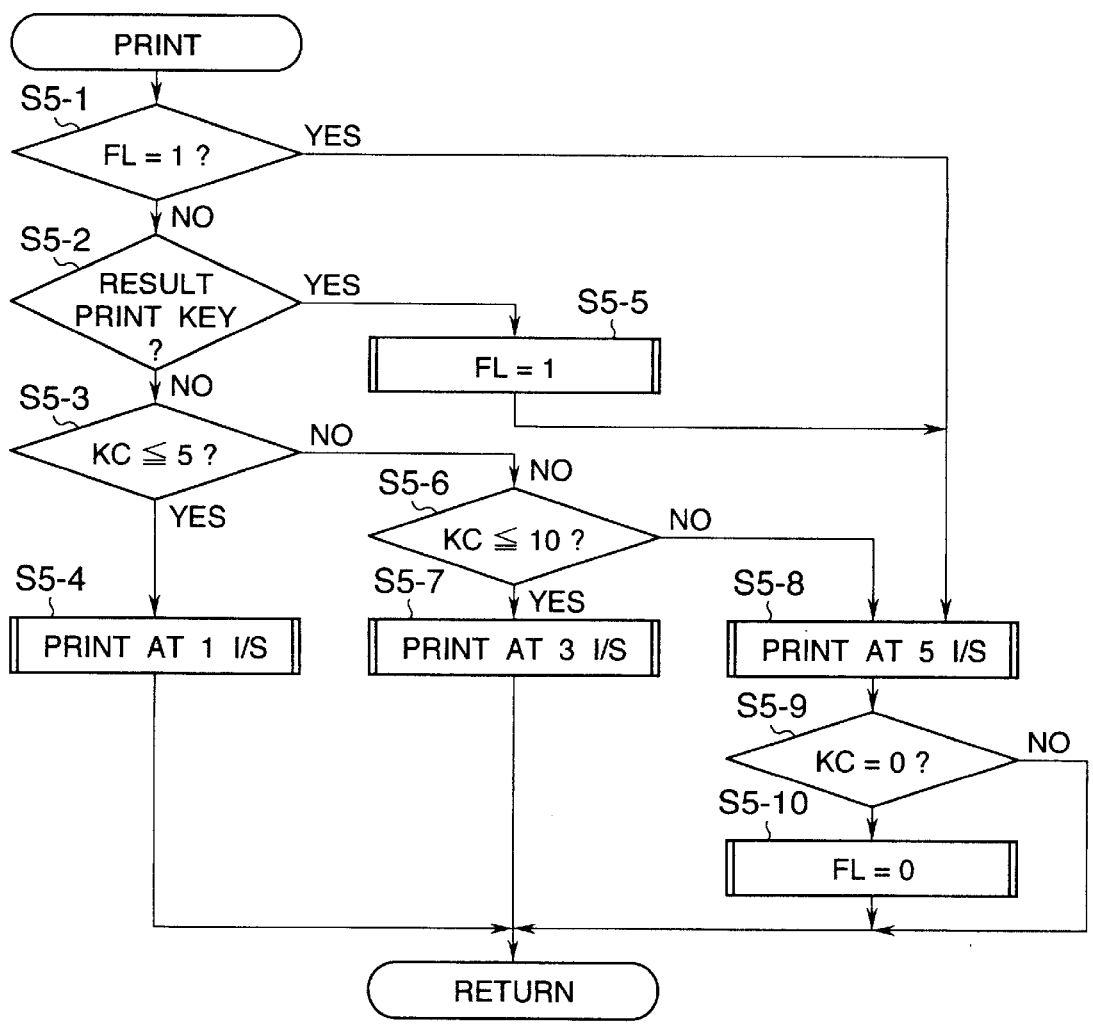
FIG. 5 is a flowchart showing a printing speed control procedure of a calculator according to the second embodiment of the invention.

The second embodiment is made in consideration of the problems of the first embodiment mentioned above. FIG. 5 shows a subroutine for such a printing process. The other construction is similar to that of the first embodiment.

In a manner similar to the first embodiment, when the print processing program is called in step S3-12 in FIG. 3, the processing routine advances to step S5-1 in FIG. 5. In step S5-1, a check is made to see if a flag FL, which will be explained hereinafter, is equal to "1" or not. When the flag FL is equal to "0", step S5-2 follows. When it is judged in step S5-2 that the key code information of the key buffer register (KB) 23a does not indicate the arithmetic operation result print key, a process to select the printing speed on basis of the count value of the key buffer counter (KC) 23c is executed in a manner similar to the first embodiment. The processing routine is returned.

When it is judged in step S5-2 that the key code information indicates the arithmetic operation result print key, the flag FL is set to "1" in step S5-5. In step S5-8, the printing process is executed at the highest printing speed of 5 l/sec in step S5-8. When the printing process of the arithmetic operation result is finished, a check is made in step S5-9 to see if the count value of the key buffer counter (KC) 23c is equal to "0" or not, namely, whether there is a key input during the printing of the arithmetic operation result or not. In step S5-9, when the count value of the key buffer counter (KC) 23c is not equal to "0" (when there is a key input during the printing of the arithmetic operation result), the subroutine of FIG. 5 is returned as it is to step S3-13 and S3-14 in FIG. 3 in the ordinary routine. In step S3-4, since the count value of the key buffer is not obviously equal to "0", the programs are sequentially processed until step S3-7. When the key input during the printing of the arithmetic operation result is the P (print) key, the subroutine of FIG. 5 is again called.

In this instance, since the flag FL is held to "1" in step S5-5, the printing command is processed at the highest printing speed of 5 l/sec (the same as the printing speed of the arithmetic operation result) in step S5-8. In step S5-9, the printing command is processed at the same speed as that of the arithmetic operation result printing until the count value of the key buffer counter (KC) 23c is equal to "0".

When it is Judged in step S5-9 that the count value of the key buffer counter (KC) 23c is equal to "0", the flag FL is reset to "0" in step S5-10 and the subroutine is finished.

As described above, the printing mode of the arithmetic operation result is continued for a new key input executed during what is called a printing of the arithmetic operation result. In this way, when the arithmetic operation result is printed, the flag is set. Likewise, until the result is printed or until the key input during the printing of the arithmetic operation result is processed, the flag is not reset. However, the printing is performed at the same printing speed as that of the printing of the arithmetic operation result by the flag. Therefore, an extreme change in printing speed such that the arithmetic operation result is performed at the high printing speed and the printing just after that is performed at the lowest speed does not occur. Therefore, the user can use the apparatus without a feeling of physical disorder. Moreover, a mechanical and electric burden on the printer is small.

In the case where the arithmetic operation result is printed to a plurality of lines as in case of an item counting, an underline printing, or the like, the invention can be also embodied to all or a part of the plurality of lines.

Although an example of the printing of the arithmetic operation result has been shown and described, the invention is not limited to such an example. Any key, such as print key regarding such a printing, or key indicative of the arithmetic operation result can be also used.

Although the amount of key buffer (key count value) has been used as means for controlling the printing mode in the embodiment, any other means such as key input speed or the like can be also used. Further, although the printing mode has automatically been changed by the key operation in the embodiment, the invention can be also applied to any type such that the printing mode is selected by a slide switch SW or the like. The invention, therefore, is not limited by the method of manually or automatically selecting the printing mode so long as a plurality of printing modes are provided.

According to the invention as described above, in the electronic apparatus with the printer in which a plurality of printing modes are controlled, the apparatus has the means for judging the arithmetic operation result printing and a specific speed, particularly, the highest printing speed is set for such a printing, so that the print result can be rapidly known even if the printer is set to any printing mode. In an apparatus which controls the printing speed by a key operation, since the printing speed of user of a slow key operation hardly becomes a high printing speed, the effect of the invention is large.

For a new print input during the printing of the arithmetic operation result, by having the means for continuing the printing mode during the printing of the arithmetic operation result, the extreme change in printing speed such that the arithmetic operation result is printed at the highest speed and the subsequent printing is performed at the lowest printing speed does not occur. Therefore, the user can use the apparatus without a feeling of physical disorder. The mechanical and electric burden on the printer is small.

What is claimed is:

1. An electronic apparatus comprising:

key input means for inputting data;

arithmetic operation means for arithmetically operating on the data inputted by said key input means to obtain an arithmetic operation result;

discrimination means for discriminating whether a print instruction is inputted by said key input means for instructing printing of the arithmetic operation result obtained by said arithmetic operation means; and change means for changing a driving speed of the motor in response to said discrimination means discriminating the key input; and control means for controlling print means to print the data inputted by said key input means at a first speed corresponding to a speed at which the data is inputted by said key input means if said discriminating means discriminates that the print instruction is not inputted, and controlling the print means to print the arithmetic operation result obtained by said arithmetic operation means at a second speed faster than the first speed if said discrimination means discriminates that the print instruction is inputted.

2. An apparatus according to claim 1, wherein the second speed is a maximum speed of the print means.

3. An apparatus according to claim 1, wherein said control means controls the print means to print data at the first or second speed by changing a speed of a motor for moving a print head of the print means.

4. An apparatus according to claim 1, wherein in printing data inputted by said key input means during printing of the arithmetic operation result, said control means controls the print means to print that data at the second speed.

5. An apparatus according to claim 1, wherein the print instruction includes an intermediate print instruction for printing of an intermediate operation result.

6. An apparatus according to claim 5, wherein said key input means includes one of a subtotal key and a subtotal memory key, and wherein the intermediate print instruction is inputted using the one of the subtotal key and the subtotal memory key.

7. An apparatus according to claim 1, said key input means comprising a total key, an equal key, a total equal key, a percentage calculation key, an extra/discount calculation key, an increase/decrease ratio calculation key, a mark-up key, a mark-down key, and a total memory key, and wherein the print instruction is inputted using one of the keys comprising said key input means.

8. A method carried out in an electronic apparatus having:

key input means for inputting data; and arithmetic operation means for arithmetically operating on the data inputted by the key input means to obtain an arithmetic operation result, said method comprising the steps of:

discriminating whether a print instruction is inputted by the key input means for instructing printing of the arithmetic operation result obtained by the arithmetic operation means; and controlling print means to print the data inputted by the key input means at a first speed corresponding to a speed at which the data is inputted by the key input means if said discriminating step discriminates that the print instruction is not inputted, and controlling the print means to print the arithmetic operation result obtained by the arithmetic operation means at a second speed faster than the first speed if said discriminating step discriminates that the print instruction is inputted.

9. A method according to claim 8, wherein the second speed is a maximum speed of the print means.

10. A method according to claim 8, wherein said controlling step controls the print means to print data at the first or second speed by changing a speed of a motor for moving a print head of the print means.

11. A method according to claim 8, wherein in printing data inputted by the key input means during printing of the arithmetic operation result, said controlling step controls the print means to print that data at the second speed.

12. A method according to claim 8, wherein the print instruction includes an intermediate print instruction for printing of an intermediate operation result.

13. A method according to claim 12, wherein the key input means includes a subtotal key or a subtotal memory key, and wherein the intermediate print instruction is inputted using the subtotal key or the subtotal memory key.

14. A method according to claim 8, wherein the key input means includes a total key, an equal key, a total equal key, a percentage calculation key, an extra/discount calculation key, an increase/decrease ratio calculation key, a mark-up key, a mark-down key, a total memory key, and wherein the print instruction is inputted using one of the keys comprising the key input means.

15. A computer useable memory medium storing a computer executable program for performing the steps of:

inputting data;

arithmetically operating on the data inputted in said inputting step to obtain an arithmetic operation result;

discriminating whether a print instruction is inputted by said inputting step for instructing printing of the arithmetic operation result obtained in said step of arithmetically operating on the input data; and controlling print means to print the data inputted in said inputting step at a first speed corresponding to a speed at which the data is inputted in said inputting step if said discriminating step discriminates that the print instruction is not inputted, and controlling the print means to print the arithmetic operation result obtained in said step of arithmetically operating on the input data at a second speed faster than the first speed if said discrimination step discriminates that the print instruction is inputted.

16. A memory medium according to claim 15, wherein the second speed is a maximum speed of the print means.

17. A memory medium according to claim 15, wherein said controlling step controls the print means to print data at the first or second speed by changing a speed of a motor for moving a print head of the print means.

18. A memory medium according to claim 15, wherein in printing data inputted in said inputting step during printing of the arithmetic operation result, said controlling step controls the print means to print that data at the second speed.

19. A memory medium according to claim 15, wherein the print instruction includes an intermediate print instruction for printing of an intermediate operation result.

20. A memory medium according to claim 19, wherein said inputting step is performed using key input means including one of a subtotal key and a subtotal memory key, and wherein the intermediate print instruction is inputted using the one of the subtotal key and the subtotal memory key.

21. A memory medium according to claim 15, wherein said inputting step is performed using key input means including a total key, an equal key, a total equal key, a percentage calculation key, an extra/discount calculation key, an increase/decrease ratio calculation key, a mark-up key, a mark-down key, and a total memory key, and wherein the print instruction is inputted using one of the keys included in the key input means.

22. A computer useable memory medium storing a computer executable program for performing a method carried out in an electronic apparatus having key input means for inputting data, and an arithmetic operation means for arithmetically operating on the data input by the key input means to obtain an arithmetic operation result, the program stored on said memory medium performing the steps of:

discriminating whether a print instruction is inputted by the key input means for instructing printing of the arithmetic operation result obtained by the arithmetic operation means; and controlling print means to print the data inputted by the key input means at a first speed corresponding to a speed at which the data is inputted by the key input means if said discriminating step discriminates that the print instruction is not inputted, and controlling the print means to print the arithmetic operation result obtained by the arithmetic operation means at a second speed faster than the first speed if said discriminating step discriminates that the print instruction is inputted.

23. A memory medium according to claim 22, wherein the second speed is a maximum speed of the print means.

24. A memory medium according to claim 22, wherein said controlling step controls the print means to print data at the first or second speed by changing a speed of a motor for moving a print head of the print means.

25. A memory medium according to claim 22, wherein in printing data inputted by the key input means during printing of the arithmetic operation result, said controlling step controls the print means to print that data at the second speed.

26. A memory medium according to claim 22, wherein the print instruction includes an intermediate print instruction for printing of an intermediate operation result.

27. A memory medium according to claim 26, wherein the key input means includes a subtotal key or a subtotal memory key, and wherein the intermediate print instruction is inputted using the subtotal key or the subtotal memory key.

28. A memory medium according to claim 22, wherein the key input means includes a total key, an equal key, a total equal key, a percentage calculation key, an extra/discount calculation key, an increase/decrease ratio calculation key, a mark-up key, a mark-down key, a total memory key, and wherein the print instruction is inputted using one of the keys comprising the key input means.

* * * * *

UNITED STATES PATENT AND TRADEMARK OFFICE
CERTIFICATE OF CORRECTION

PATENT NO. : 5,885,011

DATED : March 23, 1999

INVENTOR(S) : MANABU KANAZAWA

It is certified that error appears in the above-identified patent and that said Letters Patent is hereby corrected as shown below:

COLUMN 1

```
    Line 19, "of3.8" should read --of 3.8--;
    Line 28, "Conventional" should read
--Conventional electronic--;
    Line 29, "printer" should read --printers--; and
    Line 40, "when" should read --when printers with--.
```

COLUMN 2

```
    Line 51, "Judging" should read --judging--.
```

UNITED STATES PATENT AND TRADEMARK OFFICE
CERTIFICATE OF CORRECTION

PATENT NO. : 5,885,011

DATED : March 23, 1999

INVENTOR(S) : MANABU KANAZAWA

It is certified that error appears in the above-identified patent and that said Letters Patent is hereby corrected as shown below:

COLUMN 3

```
    Line 43, ""x"" should read --"x",--; and
    Line 49, ""%±-" "%-"" should read --"%±" "%"--.
```

COLUMN 7

```
    Line 3, "than5," should read --than 5,--;
    Line 4, "of0.2" should read --of 0.2--; and
    Line 12, "Si-5" should read --S1-5--.
```

UNITED STATES PATENT AND TRADEMARK OFFICE
CERTIFICATE OF CORRECTION

PATENT NO. : 5,885,011

DATED : March 23, 1999

INVENTOR(S) : MANABU KANAZAWA

It is certified that error appears in the above-identified patent and that said Letters Patent is hereby corrected as shown below:

<u>COLUMN 8</u>

Line 29, "Judged" should read --judged--.

<u>COLUMN 9</u>

Lines 29-31, delete "change means for changing a driving speed of the motor in response to said discrimination means discriminating the key input; and".

Signed and Sealed this

Twentieth Day of March, 2001

*Attest:*

NICHOLAS P. GODICI

*Attesting Officer*     *Acting Director of the United States Patent and Trademark Office*